(12) United States Patent
Reil

(10) Patent No.: US 7,685,081 B2
(45) Date of Patent: Mar. 23, 2010

(54) BIPEDAL WALKING SIMULATION

(75) Inventor: Torsten Reil, Summertown (GB)

(73) Assignee: Isis Innovation Ltd., Oxford (GB)

( * ) Notice: Subject to any disclaimer, the term of this patent is extended or adjusted under 35 U.S.C. 154(b) by 70 days.

(21) Appl. No.: 12/122,608

(22) Filed: May 16, 2008

(65) Prior Publication Data
US 2008/0275831 A1 Nov. 6, 2008

Related U.S. Application Data

(63) Continuation of application No. 10/469,372, filed as application No. PCT/GB02/00338 on Jan. 25, 2002, now abandoned.

(30) Foreign Application Priority Data
Feb. 28, 2001 (GB) ................. 0104995.6

(51) Int. Cl.
G06F 15/18 (2006.01)
(52) U.S. Cl. ...................................... 706/23
(58) Field of Classification Search ............ 706/23
See application file for complete search history.

(56) References Cited

U.S. PATENT DOCUMENTS

| | | | | |
|---|---|---|---|---|
| 5,124,918 A | 6/1992 | Beer et al. | ............. | 364/424.02 |
| 5,379,210 A | 1/1995 | Gruji et al. | ................. | 700/28 |
| 5,988,849 A | 11/1999 | Engelhardt | ................. | 700/56 |

FOREIGN PATENT DOCUMENTS

JP 05-228856 9/1993

OTHER PUBLICATIONS

Golliday et al., "An Approach to Analyzing Biped Locomotion Dynamics and Designing Robot Locomotion Controls", IEEE, (1977).*
Goel et al. "Synchrony, Stability, and Firing Patterns in Pulse-Coupled Oscillators", ACM Portal, (2002).*
Doerschuk, et al., A Modular Approach to Intelligent Control of a Simulated Jointed Leg, 1998.
Gilchrist, et al., "A Multisegement Computer Simulation of Normal Human Gait," 1997.
Girard, "Interactive Design of 3-D Computer-Animated Legged Animal Motion," 1986.
Golliday, et al., "An Approach to Analyzing Biped Locomotion Dynamics and Designing Robot Locomotion Controls," 1977.

(Continued)

Primary Examiner—Michael B Holmes
(74) Attorney, Agent, or Firm—Morgan, Lewis & Bockius LLP

(57) ABSTRACT

An artificial multiped is constructed (either in simulation or embodied) in such a way that its natural body dynamics allow the lower part of each leg to swing naturally under the influence of gravity. The upper part of each leg is actively actuated in the sagittal plane. The necessary input to drive the above-mentioned actuators is derived from a neural network controller. The latter is arranged as two bi-directionally coupled chains of neural oscillators, the number of which equals twice that of the legs to be actuated. Parameter optimisation of the controllers is achieved by evolutionary computation in the form of a genetic algorithm.

21 Claims, 12 Drawing Sheets

OTHER PUBLICATIONS

Golubitsky, et al., "Symmetry in Locomotor Central Pattern Generators and Animal Gaits," Nature 401, pp. 693-695 (1999).

Ijspeert, et al., "From Lampreys to Salamanders: Evolving Neural Controllers for Swimming and Walking," from Animals to Animats, Proceedings of the 5th International Conference of the Society for Adaptive Behaviour (SAB98), pp. 390 to 399, MIT Press (1998).

Issacs, et al., "Controlling Dynamic Simulation with Kinematic Constraints, Behavior Functions and Inverse Dynamics," 1987.

Kurematsu et al., "Autonomous Trajectory Generation of a Biped Locomotive Robot," Proceedings of the International Joint Conference on Neural Networks, Singapore, Nov. 18-21, 1991, IEEE, vol. 3, pp. 1983-1988.

Pratt et al., "Exploiting Natural Dynamics in the Control of a 3D Bipedal Walking Simulation," International Conference on Climbing and Walking Robots (CLAWAR99), Portsmouth, UK, Sep. 1999.

Invitation to Pay Additional Fees for International Application No. PCT/GB02/00338, mailed May 7, 2003.

* cited by examiner

BIPEDAL WALKING SIMULATION

RELATED APPLICATIONS

This application is a continuation of U.S. application Ser. No. 10/469,372, filed Mar. 12, 2004 now abandoned, "Artificial Multiped and Motion Controller Therefor," which claims priority under 35 U.S.C. 371 to International Application No. PCT/GB02/00338, filed Jan. 25, 2002, "Artificial Multiped and Motion Controller Therefor," and GB Application No. 0104995.6, filed Feb. 28, 2001, "Artificial Multiped and Motion Controller Therefor." The above applications are incorporated by reference herein in their entirety.

FIELD OF THE INVENTION

This invention relates to an artificial multiped such as a robot or a computer-generated image, and to a controller therefor. The invention relates in particular to the control of the walking of computer generated bipedal images, and particularly but not exclusively, to the body dynamics of such images.

BACKGROUND TO THE INVENTION

The control of artificial multipeds, whether embodied or physically simulated, is an inherently difficult task. There is considerable interest in this matter, from disciplines as diverse as robotics, computer animation, virtual reality and biology.

For computer animation, the use of motion capture has long been employed, wherein the desired human behaviour is filmed and then typically digitized to provide data for animation of an equivalent image. Whilst this provides realistic motion dynamics, particularly for the difficult simulation of bipeds, the technique suffers from the difficulty in generalizing walking motions, particularly in unpredictable conditions. The technique also imposes high demands on data storage capacity, and is inappropriate for robots.

A further approach which has therefore been developed, both for robots and for computer-generated images, relies upon a semi-physical representation of the multiped coupled with a controller to create movement patterns. Techniques such as inverse kinematics and inverse dynamics can be employed to place virtual limbs at the desired positions and accordingly to compute the required forces. The problem with this approach is that the controller tends to use finite state machines (because of the cyclical nature of ambulatory movement) which results in only partially realistic movement and requires hand turning of the parameters of the finite state machine.

In recent years, neural networks have been employed to improve the control of morpho-functional machines. So called recurrent neural networks (RNNs) have been found to be particularly appropriate for locomotion of multipeds, when used in combination with artificial evolution to optimize the parameter settings of the network. U.S. Pat. No. 5,124,918 discusses such an approach in the control of a hexapedal insect-like robot, and Ijspeert et al in "From Lampreys to Salamanders: Evolving Neural Controllers for Swimming and Walking" from Animals to Animats, Proceedings of the 5th International Conference of the Society for Adaptive Behaviour (SAB98), pages 390 to 399, MIT Press (1998) discuss the application of neural networks to artificial salamanders. Golubitsky et al in "Symmetry in locomotor central pattern generators and animal gaits", Nature 401, pages 693-695 (1999) discuss, at a theoretical level only, the neural controllers necessary for many-legged creatures.

There are particular problems associated with the control of bipeds, both embodied as robots and as computer simulations. Specifically, the unstable dynamics of two-legged walking require that, in general, continuous active control is necessary. Additional controllers have also been necessary to control lateral and sagittal stability. For this reason, engineering techniques such as finite state machines and conventional control theory have been considered necessary. As previously explained, this brings with it the problems of mathematical tractability, the need for manual optimisation, and limits on extendability. Bipeds controlled in this manner also tend to be relatively slow moving.

SUMMARY OF THE INVENTION

The present invention seeks to improve on the prior art. In particular, one object of the present invention is to provide an artificial morpho-functional multiped which appears qualitatively more realistic when moving. A further object is to provide a bipedal motion controller which leads to a faster evolution of stable walking, which at least alleviates the problems of the prior art biped controllers and which again causes qualitatively more realistic walking of the biped.

According to a first aspect of the present invention, there is provided a computer system comprising: processing means arranged (i) to generate an image, on a visual display unit, of a multiped having a trunk and at least two legs depending therefrom, each leg including at least a first, upper part and a second, relatively lower part; (ii) to simulate the Newtonian forces that would be acting upon each separate part of the multiped at a given time and to apply these simulated forces to each said separate part so that, when displayed, each part moves under the influence of these simulated forces; (iii) to cause the image of each upper leg part to pivot about the trunk; (iv) to cause the image of the upper part of each leg to be moved via a simulated actuator in an arc relative to the said trunk; and (v) to cause the image of each relatively lower leg part to describe an apparently substantially free-swinging movement relative to its respective upper part; (vi) to provide a neural network having a plurality of neurones, the output of which neural network controls the actuator movement of each upper leg part such that the image of the multiped appears to walk.

The use of "passive dynamics", that is, the use of freely swinging relatively lower leg parts with only the upper part of the leg being actuated, provides a walking gate of an anthropomorphic nature. It will of course be appreciated that the same effect is achieved even if the lower leg part is actuated, (although at the expense of further hardware and control) provided that the net result is that the lower leg part moves in a manner which appears to be free swinging or nearly so, and the scope of the claim is to be construed accordingly. Actuation of the lower leg part may in fact be desirable if the multiped is to circumvent or climb over objects. Indeed, a weak constant simulated torque applied between the upper and lower leg parts, which tends to straighten the leg, has been found to be particularly useful. The strength of the torque is sufficiently small that the lower leg part nevertheless appears substantially free-swinging. Likewise, although a leg with only two parts, upper and lower, is preferred, the claim is not restricted thereto and multi-jointed legs are contemplated as well.

Preferably, the processing means is further arranged to simulate the actuator by calculating the simulated torque, 'T, required to move the image of the upper part of each leg, under the effect of the said simulated Newtonian forces, in response to an output from the neural network.

The actuator used to cause movement of the upper part of each leg may take several forms. In one preferred embodiment, the actuator is a proportional-integral-derivative (P-I-D) actuator in which, preferably, the torque 'T at a time T is related to the angle 1 in accordance with the equation $$\Gamma_T = k_P(\theta_d - \theta) - k_D \frac{d\theta}{dt} + k_I \int_{T-\delta T}^{T+\Delta T} (\theta_d - \theta)\,dt$$

where $k_P$, $k_D$ and $k_I$ are the proportional, derivative and integral coefficients, and t is time.

In particularly preferred embodiments, the coefficient $k_I$ is set to or near zero, so that the actuator becomes a proportional-differential (PD) actuator.

An actuator implementation of this type requires as input the desired angle between the upper part of the leg and the trunk (equivalent to the desired length of a biological muscle). The necessary force (torque) to reach the "sweet spot" is calculated by the actuator itself. In other words, motor commands from the neural network to the actuator do not, in the preferred embodiment, represent forces, but instead represent desired kinematic parameters like relative joint angles.

The use of PID or PD controllers brings about several advantages. Firstly, control is provided at a low level, as any discrepancy between the actual and the desired angle is automatically reduced. As a consequence, the tendency of the computer-generated images of the limbs (for example) to buckle under the simulated body mass is counteracted directly by the actuator, a task which would otherwise have to be accomplished by the neural network. In addition, by tuning the allowed desired angle ($1_d$) range, upper and lower limits to limb movement can easily be achieved. This is not possible if the neural network has explicitly to specify forces rather than desired angles.

Yet a further advantage is that a joint actuator arrangement which acts as one entity rather than implementing single muscles (agonists, synergists, antagonists) greatly reduces the degrees of freedom of the system (and of the neural network controller).

In other preferred embodiments, however, the processing means is further arranged to simulate the actuator as a force limited velocity constraint actuator in which the torque, 'T, applied to the upper part of each of the two legs is a function of the desired velocity of movement of the upper part of the one leg relative to the body trunk, and wherein the desired velocity of movement is related to a difference between the actual and the desired angle between the two upper leg parts, the desired relative angle being derived from the neural network.

The object point to which an angle of an upper leg part is relative is of course arbitrary for perfectly symmetrical walking. A relative angle between one leg and the trunk is functionally equivalent to a relative angle between one of the upper leg parts a fixed point for example. For perfectly symmetrical walking, indeed, it would be possible to measure the angle of one leg relative to the other.

In each case, it is to be understood that application of the torque to the upper leg parts may be directly (i.e. to a simulated thigh muscle), to a simulated hip joint or both.

Preferably, the multiped has only a single actuator per leg, such that the lower leg parts swing freely. Multiple actuators for each leg are however envisaged as well.

Most preferably, the multiped is simulated as a biped with two hip joints, each hip joint connecting the upper part of a respective one of the two legs to the trunk. The hip joint is constrained to have only a single degree of freedom in the preferred embodiment. It has been found that lateral and twist movements are not necessary for straight line walking.

Preferably, the processor is further arranged to generate an image of a plurality of feet, each of which appears to be connected to an end of the image of the lower part of a corresponding leg via an ankle joint, and wherein the processor simulates the action of a damped torsional spring to govern the movement of each said ankle joint.

During walking, the feet represent the only physical interface between a walking multiped and its environment, and therefore play an important role in its locomotion. In particular, by acting analogously to a damped spring, the ankles serve to allow a smooth roll of the foot over the floor whilst simultaneously storing energy. At toe lift-off, this energy is released to used to initiate the next stride. No active neural network control is required for this task.

The processor may also limit the angle between the image of the upper part and the image of the lower part of each leg. The reason for this is that a passively swinging lower leg preferably requires a mechanism to provide a rapid stop to the movement at full extension. Although an appropriately controlled and timed actuator could in principle achieve this functionality, a preferred solution is to place a soft angular limit on the knee joint (that is, the angle between the upper and lower parts of each leg).

In a particularly preferred embodiment, the neurones of the neural network are arranged as a recurrent neural network (RNN) so as to form two bi-directionally coupled chains of identical oscillators, at least two of the neurones acting as motor neurones whose output controls the said actuator associated with the upper part of each said leg.

The neural network architecture of the preferred embodiment acts as a central pattern generator. The number of identical oscillators in each chain is preferably twice that of the appendages to be actuated. In other words, four oscillators per chain or eight in total are preferred to control quadrupeds, whereas two oscillators per chain, i.e. four in total, are desirable for bipeds.

Most preferably, the recurrent neural network comprises one recurrent subnet per oscillator, and each recurrent subnet preferably comprises six nodes as this was found to produce a high degree of spontaneous cyclic activity. Each of these recurrent subnets is connected to a laterally adjacent recurrent subnet (i.e., a recurrent subnet in the other of the two chains) via symmetrical weights so as to allow bidirectional coupling. Each neurone in each recurrent subnet is preferably arranged to synapse with its equivalent in the opposite recurrent subnet in the opposite chain. Connections to sagittal neighbours are asymmetric, in the preferred embodiment, that is, each neurone is preferably connected to its equivalent in the next recurrent subnet in the same chain, but no connections exist the other way.

For a biped, preferably, two of the nodes in the RNN are designated as motor neurones, with the output of these nodes being used to control left and right sagittal hip actuation. More generally, it is preferable to have one motor neurone per leg to be actuated in a multiped.

The use of identical oscillators as well as only two sets of coupling weights (lateral and sagittal) limits the search spaced (for the network parameters) to a total of 60 parameters (36 weights plus 12 neurone parameters plus 6 lateral weights plus 6 sagittal weights).

Furthermore, an ancillary stability controller may be applied at the beginning of an optimization procedure, to improve the overall speed of evolution of stable network parameters. The effect of this ancillary controller is gradually reduced in subsequent optimisation iterations.

Preferably, the properties of the neurones and their connections within the said neural network are determined on the basis of a genetic algorithm. Most preferably, the criterion used to optimise the network parameters is that the distance over which an end of the lower part of a rearmost leg in the image of the multipedal object, relative to that origin, should be maximized relative to the said origin.

Rapid optimization of the network parameters is further achieved, in preferred embodiments, by aborting consideration of trial arrays of networks parameters as soon as certain undesirable situations occur. For example, if the centre of mass of the simulated body drops below a certain, predetermined value, then any resultant locomotion will certainly not appear realistic and the network parameters resulting in this form of image control are considered non-ideal. Enforcing the early abortion of unpromising runs speeds up evolution dramatically.

According to a second aspect of the present invention, there is provided a controller for a computer-generated image of a biped, the image comprising two legs depending from a trunk, each leg being actuated by a computer simulated actuator, the controller comprising a neural network having a plurality of neurones, the output of the neural network being arranged to control the computer simulated actuator such that the image of the trunk is caused to move as the image of the legs is moved.

The invention also extends to a computer system comprising processing means arranged (i) to generate an image, on a visual display unit, of a biped having a trunk and legs depending therefrom, each leg including at least a first, upper part and a second, relatively lower part; (ii) to simulate the Newtonian forces that would be acting upon each separate part of the biped at a given time and to apply these simulated forces to each said separate part so that, when displayed, each part moves under the influence of these simulated forces; (iii) to cause the image of each upper leg part to pivot about the trunk; (iv) to provide a neural network having a plurality of neurones together arranged to act as two bi-directionally coupled pairs of identical oscillators; (v) to cause the image of the upper parts of each of the two legs to be moved by a force limited velocity constraint actuator, in an arc relative to the said trunk, the actuator being simulated by the processing means to calculate the simulated torque, T, required to move the image of the upper part of its associated leg, under the effect of the said simulated Newtonian forces, as a function of the desired velocity of movement of the upper part of the one leg relative to the upper part of the other leg, and wherein the desired velocity of movement is related to a difference between the actual and the desired angle between the two upper leg parts, the desired relative angle being derived from the neural network; and (vi) to cause the image of each lower leg part to describe an apparently substantially free-swinging movement relative to its respective upper part as the said upper part moves in its said arc; the output of the neural network being arranged to control the simulated actuator such that the image of the trunk is caused to move as the image of the legs is moved.

In yet a further aspect of the present invention, there is provided computer program comprising program elements which, when executed on a digital computer, cause a processor thereof: (i) to generate an image, on a visual display unit, of a multiped having a trunk and at least two legs depending therefrom, each leg including at least a first, upper part and a second, relatively lower part; (ii) to simulate the Newtonian forces that would be acting upon each separate part of the multiped at a given time and to apply these simulated forces to each said separate part so that, when displayed, each part moves under the influence of these simulated forces; (iii) to cause the image of each upper leg part to pivot about the trunk; (iv) to provide a neural network having a plurality of neurones together arranged to act as two bi-directionally coupled pairs of identical oscillators; (v) to cause the image of the upper parts of each of the two legs to be moved by a force limited velocity constraint actuator, in an arc relative to the said trunk, the actuator being simulated by the processing means to calculate the simulated torque, T, required to move the image of the upper part of its associated leg, under the effect of the said simulated Newtonian forces, as a function of the desired velocity of movement of the upper part of the one leg relative to the upper part of the other leg, and wherein the desired velocity of movement is related to a difference between the actual and the desired angle between the two upper leg parts, the desired relative angle being derived from the neural network; and (vi) to cause the image of each lower leg part to describe an apparently substantially free-swinging movement relative to its respective upper part as the said upper part moves in its said arc; the output of the neural network being arranged to control the simulated actuator such that the image of the trunk is caused to move as the image of the legs is moved.

In this case, the computer program may be stored upon a computer-readable storage medium such as a magnetic or optical disc. Alternatively, it may be embodied upon an electromagnetic signal.

Still a further aspect of the present invention provides a method of controlling the locomotion of a computer-generated biped, comprising the steps of: (a) establishing a neural network having a plurality of neurones; (b) generating a computer image of a body trunk and at least two legs, each leg depending from the trunk; (c) simulating the Newtonian forces that would be acting upon each separate part of the computer-generated object at a given time; (d) applying those simulated forces to each said separate part so that, when displayed on a visual display unit, each part appears to move under the influence of those simulated forces; (e) simulating an actuator for actuation of each said leg; and (f) controlling the operation of the actuator via an output from the neural network.

A method of optimising the network parameters in a neural network controller for controlling the locomotion of a computer-generated image of a multiped is also provided. The method comprises: (i) generating a plurality of different trial arrays of network property values; (ii) applying the different trial arrays to the neural network to create different trial neural networks; (iii) identifying those arrays selected from the plurality of different arrays which, when applied to the neural networks, form trial neural networks which optimize the control of the said image of the multiped in accordance with at least the criterion that the distance, d, over which an end of the lower part of a rearmost leg of the computer-generated image should have travelled from the origin should be maximized; the method further comprising: aborting, as non-optimized, the consideration of those arrays forming trial neural networks when at least one of the following conditions is met: (a) a point attractor is reached such that the image when controlled by that trial network stops moving away from the origin, (b) the trunk of the multiped, as determined by applying Newtonian mechanics to the object, drops below a threshold height; and/or (c) the multiped does not move away from the origin and/or falls over prior to moving away therefrom.

It is to be understood that the invention is equally applicable to both computer-generated images and to embodied multipeds, such as robots. Therefore, according to still a further aspect of the present invention, there is provided an artificial multiped, comprising: a body trunk; at least two legs depending from the trunk, each leg having at least a first, upper part and a second, relatively lower part pivotable about the said first upper part; a plurality of hip joints each connecting the upper part of an associated leg to the body trunk; an actuator arranged to move the upper part of each leg in an arc about the hip joint; a neural controller arranged to control the movement of the said actuator such that, as each upper leg part is moved through the said arc, the corresponding lower part thereof is arranged to describe an apparently substantially free-swinging movement over at least a part of the said upper leg part movement.

Where the multiped is embodied rather than computer-generated, the angle between the upper and lower parts of the legs can be limited using an artificial kneecap rather than calculation of angular limit.

The invention also extends to a controller for an artificial biped, the biped comprising two legs depending from a trunk and being capable of actuation via an actuator, the controller comprising a neural network having a plurality of neurones, at least two of the neurones acting as motor neurones which are arranged to control the movement of the actuator so as to cause locomotion of the trunk via the legs.

In another aspect of the present invention, there is provided an artificial biped comprising: a body trunk; two legs depending from the trunk, each leg having a first, upper part and a second, lower part freely pivotable about the said first upper part; two hip joints, each one connecting the upper part of an associated one of the two legs to the body trunk; a controller, comprising two bi-directionally coupled pairs of identical oscillators embodied as a neural network having a plurality of neurones, at least two neurones acting as motor neurones; and a force-limited velocity constraint actuator arranged to move the upper part of each leg in an arc about its associated hip joint, and in which the torque, T, applied to the upper part of each of the two legs is a function of the desired velocity of movement of the upper part of the one leg relative to the upper part of the other leg, and wherein the desired velocity of movement is related to a difference between the actual and the desired angle between the two upper leg parts, the desired relative angle being derived from the neural controller; the controller being arranged to control the actuation of the actuator such that, as each upper leg part is moved through the said arc, the corresponding lower part thereof describes an apparently substantially free-swinging movement over at least a part of the said upper leg part movement.

Although aspects of the invention focus upon neural control of bipeds, it is to be understood that the invention has broader application. Any cyclical movement of a body part can be controlled in this manner. For example, the flapping of bird's wings (either embodied or simulated) can be controlled in an analogous manner. Therefore, in accordance with still a further aspect of this invention, there is provided a controller for control of cyclical movement of an appendage of an artificial or computer-simulated body, the controller comprising a neural network having a plurality of neurones together arranged to act as two bi-directionally coupled arrays of identical oscillators.

In summary, aspects of the invention provide an artificial or simulated biped in which the length of evolutionary optimization required to evolve parameters for a neural network that produces straight line walking of that biped is very short. Moreover, the large majority of neural networks obtained via the optimization procedures result in successful controllers. Furthermore, the perceived realism of the body dynamics of a biped or other device/object having more than two legs is increased relative to actual multipedal walking, particularly for bipeds such as humans. This can be confirmed by comparison with motion capture data. The use of free swinging lower legs constrains the walking dynamics in a particularly favourable manner. Walking styles that do not make use of a full lower leg swing (and hence a kneecap) were less stable than those which do.

The neuro-evolutionary approach of aspects of this invention allows the overall body control to be fully automated which provides several advantages, including body implementation flexibility and the avoidance of the need for manual retuning of controller parameters. The neural network architecture of further aspects of the invention also allows the integration of sensory (in particular proprioceptive) feed back and tonic input to the controller, which may in turn allow improved robustness of walking gaits on uneven terrain by appropriate modulation of the neural network.

BRIEF DESCRIPTION OF THE DRAWINGS

The invention may be put into practice in a number of ways, and one embodiment will now be described by way of example only and with reference to the accompanying drawings in which:

FIGS. 2a-2d show side views of a sequence of movement of the biped of FIG. 1a;

DETAILED DESCRIPTION OF EMBODIMENTS

The following will describe, by way of example, the currently preferred arrangement which illustrates the various aspects of the present invention. The bipedal object in the following example is computer-generated. However, it is to be understood that the principles underlying the present invention are equally applicable to quadrupeds and other multi-limbed creatures and even to control of other limits such as birds' wings, provided that they exhibit cyclical movement in use. Furthermore, it is to be understood that the present invention is equally applicable to embodied devices such as multipedal and, more specifically, bipedal robots.

Figure 1A:
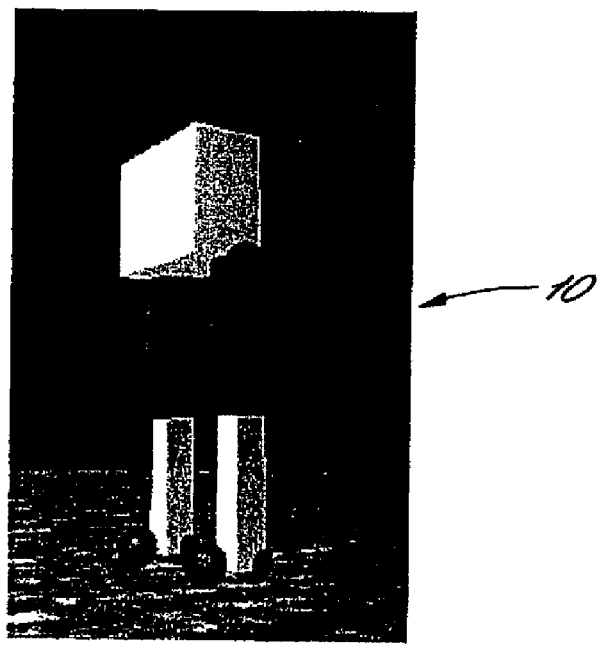
FIGS. 1a and 1b show fully rendered and wire-frame versions of a computer-generated biped embodying an aspect of the present invention.
Figure 1B:
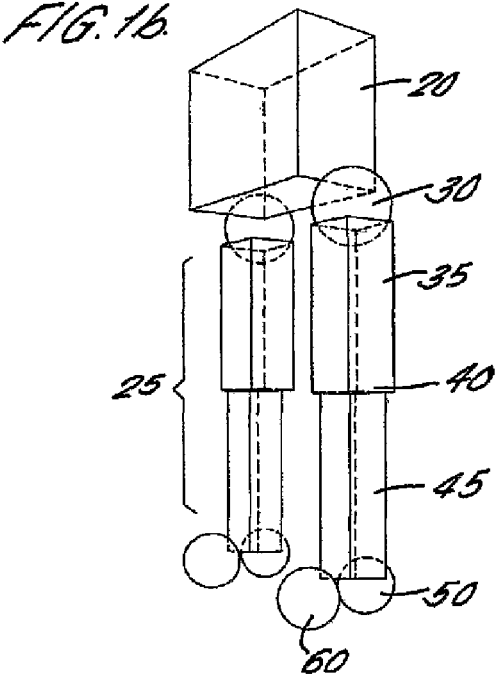
Figure 2D:
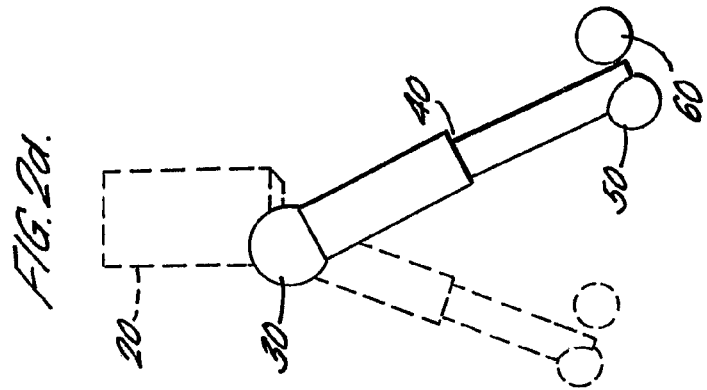
Figure 2C:
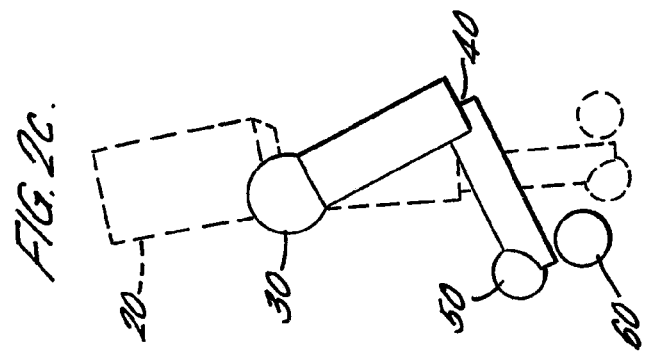
Figure 2B:
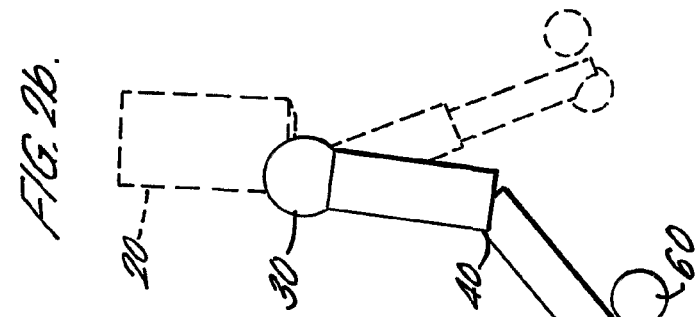
Figure 2A:
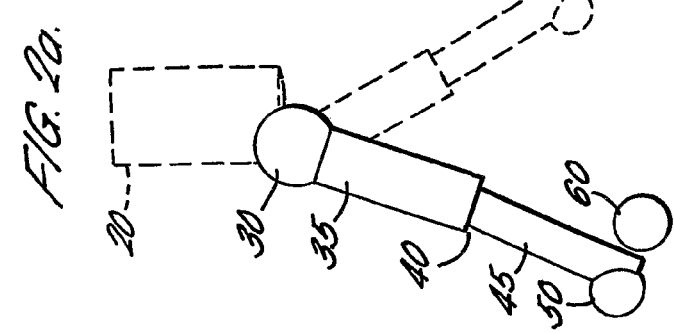

Referring first to FIGS. 1a and 1b, fully rendered and wire-framed versions of a computer-generated biped 10 are respectively shown. The biped is simulated using a rigid body dynamics simulation program. Such programs are well known in the art and are available either as commercial or as freeware/open source software. Rigid body dynamics simulation software simulates the motion of idealised bodies connected by idealised joints. The bodies are able to collide with one another, rest and slide over one another and so forth. The software calculates the Newtonian mechanics for a body having specified parameters, so that when these bodies are moved, they appear to move as if under the influence of gravity, for example.

The biped shown in FIG. 1a in particular is simulated using Dynamics Toolkit Version 0.0.5, by MathEngine plc, Oxford, UK. This program is particularly preferred because it is optimised for speed rather than accuracy which is useful when using evolutionary optimisation. A further advantage is that this program includes a force limited velocity constraint algorithm. This is useful for actuation of the limbs as will be explained below.

The MathEngine program is delivered as a suite of libraries coded in C and assembler. Objects are called from the libraries to build the simulated biped shown in FIGS. 1a and 1b.

As seen more clearly in FIG. 1b, the biped which is simulated by the MathEngine program comprises a body trunk 20 and two legs 25 which each depend from the body trunk 20. Each leg comprises a first, upper part 35 and a second, lower part 45. The upper part 35 of each leg is journalled about the body trunk 20 via a corresponding hip joint 30. The lower part 45 of each leg pivots about the upper part 35 of the same leg via a knee joint 40. At the end of each leg is a foot 60 which pivots about the lower part 45 of an associated leg via an ankle joint 50. In currently preferred embodiments, the biped has eight degrees of freedom: hip-roll, hip-pitch, knee-pitch, and ankle-pitch. As will be explained below, only the two hip joints 30 are actively actuated.

The specific dimensions of the biped shown in FIGS. 1a and 1b are set out in Table 1 below.

TABLE 1

| BODY | IMPLEMENTATION | DIMENSIONS |
|---|---|---|
| Heel | sphere | 0.08 m radius |
| Toe | sphere | 0.08 m radius |
| Calf | cuboid | 0.125 m × 0.540 m × 0.125 m |
| Thigh | cuboid | 0.175 m × 0.500 m × 0.175 m |
| Hip | sphere | 0.125 m radius |
| Pelvis/body trunk | cuboid | 0.500 m × 0.500 m × 0.600 m |

Each body part, as set out in Table 1 above, is modelled using a simulated density of 1 kg/l. It will be appreciated that a simple block is employed to simulate the body trunk of the biped in the current implementation. This is because the dynamics of the upper part of the body present different (and, generally, more straightforward) problems to those which are addressed by the present invention. Therefore, to aid understanding, the details of the upper part of the body of the biped described herein are not given.

In order to allow simulated walking of the biped shown in FIGS. 1a and 1b, three distinct design solutions are proposed. Each individually and in combination facilitates the rapid evolution of an anthropomorphic walking style.

Body Dynamics

The biped of FIGS. 1a and 1b is caused to move by a combination of actuation and passive swinging. In particular, the hip joints 30 actuate the upper leg parts 35, and the lower leg parts 45 are allowed to follow passively, i.e., without separate actuation. Given this, the control task for straight line walking of the biped 10 can be simplified to two degrees of freedom (the hip joints 30) for the biped 10.

The dynamics of a leg 25 in which the upper part 35 is actuated and the lower part 45 swings passively are shown in the sequence of FIGS. 2a to 2d. The passive, lower leg part 45 is accelerated only by the effect of the simulated gravity thereupon, in combination with the pulling movement of the upper leg part 35. In addition to simplification of the control (because the knee joint is not actively actuated, in contrast to previous morpho-functional machines), this implementation markedly increases the realism of the walking pattern produced.

Because the lower leg part 45 of each leg 25 is allowed to swing passively, a mechanism is required to provide a rapid stop to the movement at full extension. Whilst an appropriately controlled and timed actuator could in principle achieve this functionality, it is simpler to employ a simulated kneecap. In the preferred implementation, a soft angular limit to the knee joint 40 is simulated. Of course, in an embodied morpho-functional machine, such as a robot, a physical kneecap can be employed instead.

Whilst a completely free-swinging kneecap is successful in allowing realistic walking gaits to be simulated, in fact in presently preferred embodiments a weak constant torque is applied between the upper and lower leg parts 35, 45. The torque is applied in the direction that would tend to straighten the leg. It is to be understood that this weak constant torque is by no means essential, however, and in any event is sufficiently weak that it is not, or at least barely, discernable to the human eye.

The simulated biped 10 also employs feet 60. These represent the only physical interface between a walking biped and its environment, and therefore play an important role in its locomotion. By acting analogously to a damped spring, the ankle joints 50 serve to allow a smooth roll-off of the foot 60 over the simulated floor, whilst simultaneously storing energy. Upon liftoff of the front of the foot, this energy is released and used to initiate the next stride. No active control of the foot 60 or ankle joint 50 is required for this task. The presently preferred implementation simulates a damped torsional spring in each of the ankle joints 50. Again, this can readily be performed through the libraries available in the MathEngine program.

Actuators

In humans and animals, simple lower level mechanisms such as spinal reflexes are believed to be important in coordination of movement. In the present case, an actuator is employed as a low level controller which takes as inputs the relative angles and angular velocities of the two body parts (here, the upper leg parts 35) being actuated from a simulation, a desired relative angle from the neural controller, and which calculates a torque to be applied equally and oppositely to the two body parts being actuated.

An actuator must generate the effect of turning body parts towards the desired relative angle smoothly and at a reasonably controlled pace.

There are several types of actuator that can be used, and which provide the level of control necessary for stable biped locomotion. For example, a proportional integral derivative (PID) controller can be used. Applied to the actuator control of the hip joints in the biped 10 of FIGS. 1 and 2, it is possible to express the torque T as a function of the desired angle between the upper part 35 of the leg and the body trunk 20 and the actual angle between those two parts. In particular, the torque 'T at time T can be expressed as $$\Gamma_T = k_P(\theta_d - \theta) - k_D \frac{d\theta}{dt} + k_I \int_{T-\delta T}^{T+\Delta T} (\theta_d - \theta) dt$$

where $k_P$, $k_D$ and $k_I$ are the proportional, derivative and integral coefficients respectively, $\mathbf{1}_d$ is the desired angle and 1 is the actual angle. In practice, the integral coefficient $k_I$ and the period t are small or vanishing. Thus the actuator tends to a proportional derivative actuator.

The code to simulate the actuator is written in C or C++ and forms a subroutine called from within MathEngine.

An actuator implementation of this type requires as input the desired angle which is, in this case, equivalent to the desired length of a biological muscle. The necessary force to reach the "sweet spot" is calculated by the actuator itself. That is, motor commands from higher control centres (such as a central pattern generator, as described below) to actuators do not represent forces, but desired kinematic parameters like relative joint angles.

The use of PID controllers brings about several advantages. They provide control at a low level, as they automatically reduce any discrepancy between the actual and the desired angle. As a consequence, the tendency of limbs, for example, to buckle under the simulated body mass is counteracted directly by the actuator, a task which would otherwise have to be accomplished by a separate controller. In addition, by tuning the allowed desired angle ($\mathbf{1}_d$) range, upper and lower caps to limb movement can easily be achieved. This is not possible if the higher control centre is required explicitly to specify forces rather than desired angles.

Finally, a joint-actuator arrangement that acts as one entity rather than implementing single muscles (agonists, synergists, antagonists) greatly reduces the degrees of freedom of the system and of the overall system controller (for which, again see below).

Whilst PID or PD controllers have their advantages, they do also suffer from a number of drawbacks. Firstly, changes in the control environment (e.g. the simulated load on the simulated body) require dynamic parameter modulation of the PID. Because this modulation must itself be controlled, more degrees of freedom are inevitably added to the system.

Secondly, PID controllers may bring about numerical instabilities. For these reasons, the presently preferred implementation employs a different but conceptually analogous actuator type known as a force limited velocity constraint actuator. Such actuators allow the user to specify a desired relative velocity between two bodies. They tend to be more reliable than PD or PID actuators, but are typically computationally more expensive.

In the present case, the relative angle between the two upper leg parts 35 is used as a first input. A desired angle is input from the neural controller (see below). A demand velocity is then calculated whose magnitude is related to the difference between the actual relative angle and the desired relative angle. The demand velocity is used by the constraint solver of the simulation to calculate the torques required to satisfy this request. The torque is applied equally and oppositely to the two upper leg parts 35, unless the calculated torque exceeds a maximum ('$_{max}$), in which case the maximum is applied. In that case, then, an external modulation of controller parameters becomes unnecessary.

In the case of each actuator type, several constants need to be predetermined, i.e. $k_P$, $k_D$, $k_I$)t or '$_{max}$. These are determined by experimentation with the simulation and can be used from then on for all simulations of similar scale.

Controller Architecture

Figure 3:
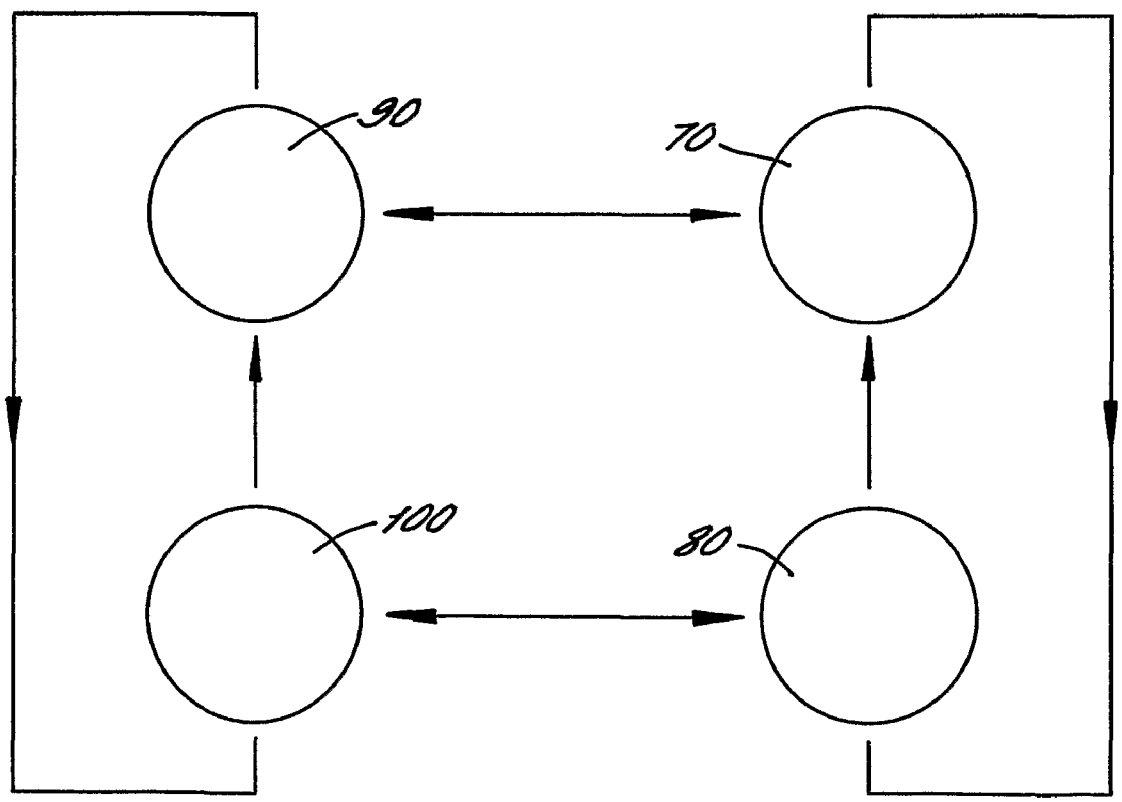
FIG. 3 shows a schematic arrangement of a central pattern generator (CPG) suitable for controlling the locomotion of the biped of FIGS. 1 and 2, and embodying another aspect of the present invention.

The third part of the system which allows realistic locomotion of the biped 10 is a neural network which acts as a global controller for the biped. The structure is shown in FIG. 3. The structure comprises four identical oscillators 70, 80, 90, 100, arranged as two bi-directionally coupled chains. More generally, the number of oscillators in each chain should correspond to the number of appendages to be actuated. Thus, for quadrupeds, each chain would consist of four identical oscillators such that the overall structure contains eight identical oscillators.

Figure 4:
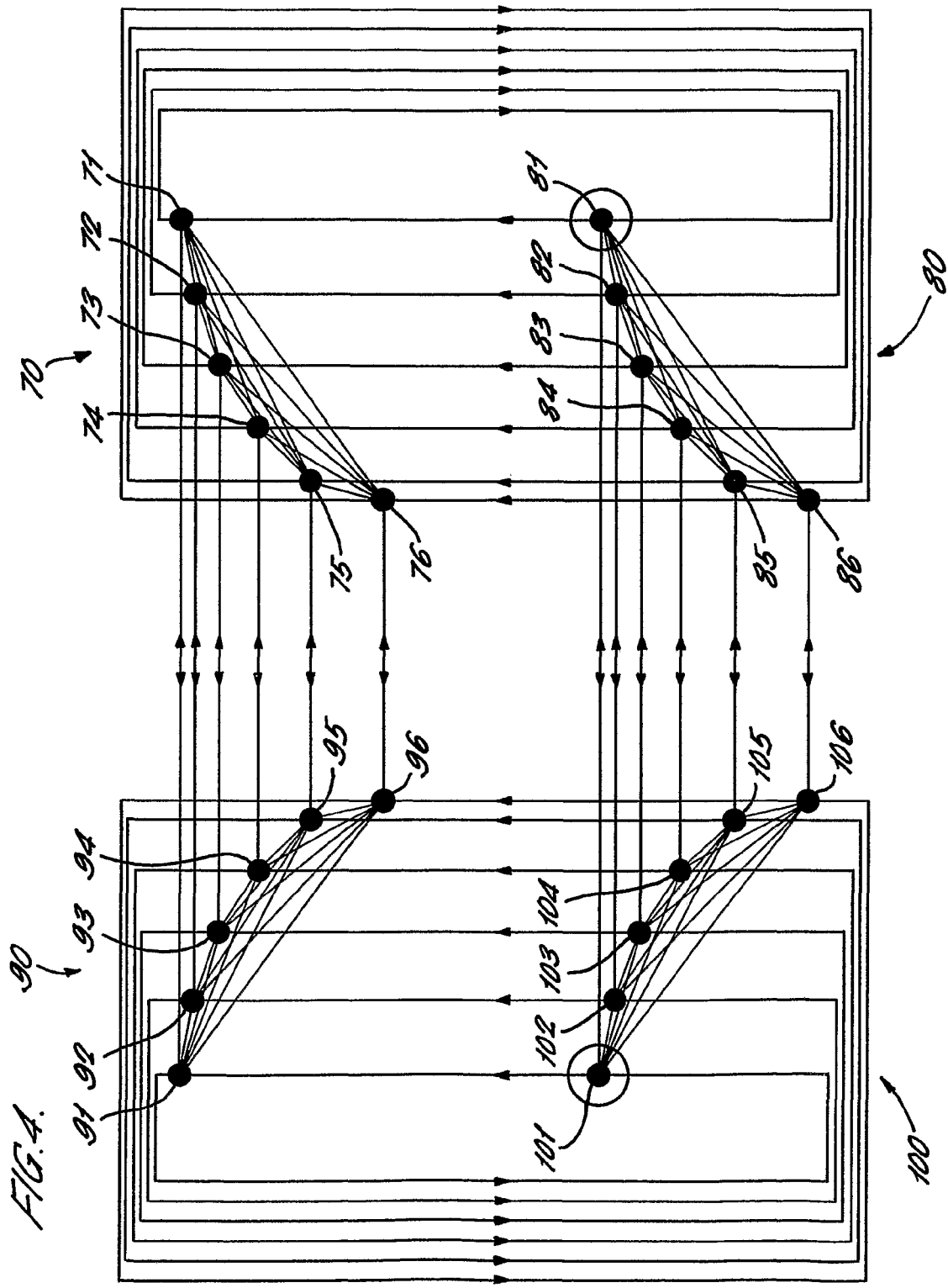
FIG. 4 shows a specific neurone arrangement to implement the CPG of FIG. 3 as a neural network.

The generalized structure of FIG. 3 is implemented for the computer-simulated biped 10 as a neural network, again written as a subroutine in C or C++; the network connections are shown in FIG. 4. Each oscillator 70, 80, 90, 100 is represented by a fully connected recurrent neural network having six nodes 71-76, 81-86, 91-96 and 101-106. The oscillators 70 and 90 are laterally adjacent but in different oscillator chains. Likewise, the oscillators 80 and 100 are laterally adjacent but in different oscillator chains. Each neurone in one of the laterally adjacent oscillators is connected to its equivalent neurone in the laterally opposite oscillator via a symmetrical weight so as to allow bi-directional coupling. For example, the neurone 71 in the oscillator 70 is connected to the neurone 91 in the oscillator 90.

By contrast, the connections to the sagittal neighbours are asymmetric, as seen most readily in FIG. 3. In the neural network arrangement of FIG. 4, each neurone in oscillator 80 (such as neurone 86) is connected to its equivalent (neurone 76 in this example) in the next or other oscillator in the same chain (in this case, oscillator 70), but no connections exist the other way.

The neurone model of FIG. 4 includes a time constant $J_j$ and a bias $t_j$.

At each iteration, the activity of the $j^{th}$ neurone in the RNN of FIG. 4 is computed according to:

$\tau_j \dot{A}_j = -A_j + \Sigma \omega_{ij} O_i$ where $J_j$ is the time constant of $j^{th}$ neurone, $A_j$ its activity, $O_i$ the output of the $i^{th}$ to the $j^{th}$ neurone, and $j_{ij}$ the weight from the $i^{th}$ to the $j^{th}$ neurone. The corresponding output is:

$O_j = (1 + e^{(t_j - A_j)})^{-1}$ where $t_j$ is the bias of the $j^{th}$ neurone.

These parameters have allowed ranges, as do the synapse weight parameters.

The ringed neurones 81 and 101 in FIG. 4 are designated motor neurones. Their outputs are between 0.0 and 1.0 and are scaled to drive the actuators to move the upper leg parts 35 through the allowed angles. The motor neurone 101 is used for sagittal actuation of the left hip joint 30 of the biped 10, and the motor neurone 81 is used for sagittal actuation of the right hip joint 30 in the biped 10.

The use of identical oscillators as well as only two sets of coupling weights (lateral and sagittal) limits the search space to a total of 60 parameters (36 weights, 12 neurone parameters, 6 lateral weights and 6 sagittal weights). This allows the time taken to optimise the parameters to be reduced dramatically.

Genetic Algorithm

The parameters of the neural network which are to be evolved are the synapse weights and the node properties (time constants and biases). These are encoded as real numbers in a linear chromosome with different ranges for each parameter, typically [−16.0, 16.0] for the weights, [0.5, 5.0] for the time constants and [−4.0, 4.0] for the biases. The algorithm as a whole is yet another bespoke C or C++ subroutine which can be called as necessary by the graphics simulator. The mutation rate is chosen so as to cause an average of one substitution per individual. No crossover operator is applied.

Rank-based selection is used on a population of 100 individuals, with a fittest fraction of 0.5. This is equivalent to culling the bottom, weakest half of the population, and replacing it with a copy of the top half. This latter procedure is known, as such, from, for example, W. D. Hillis, "Co-evolving parasites improves simulated evolution as an optimisation procedure", in Artificial Life II, edited by C. Langton et al, Addison-Wesley at pages 313-324.

Figure 5:
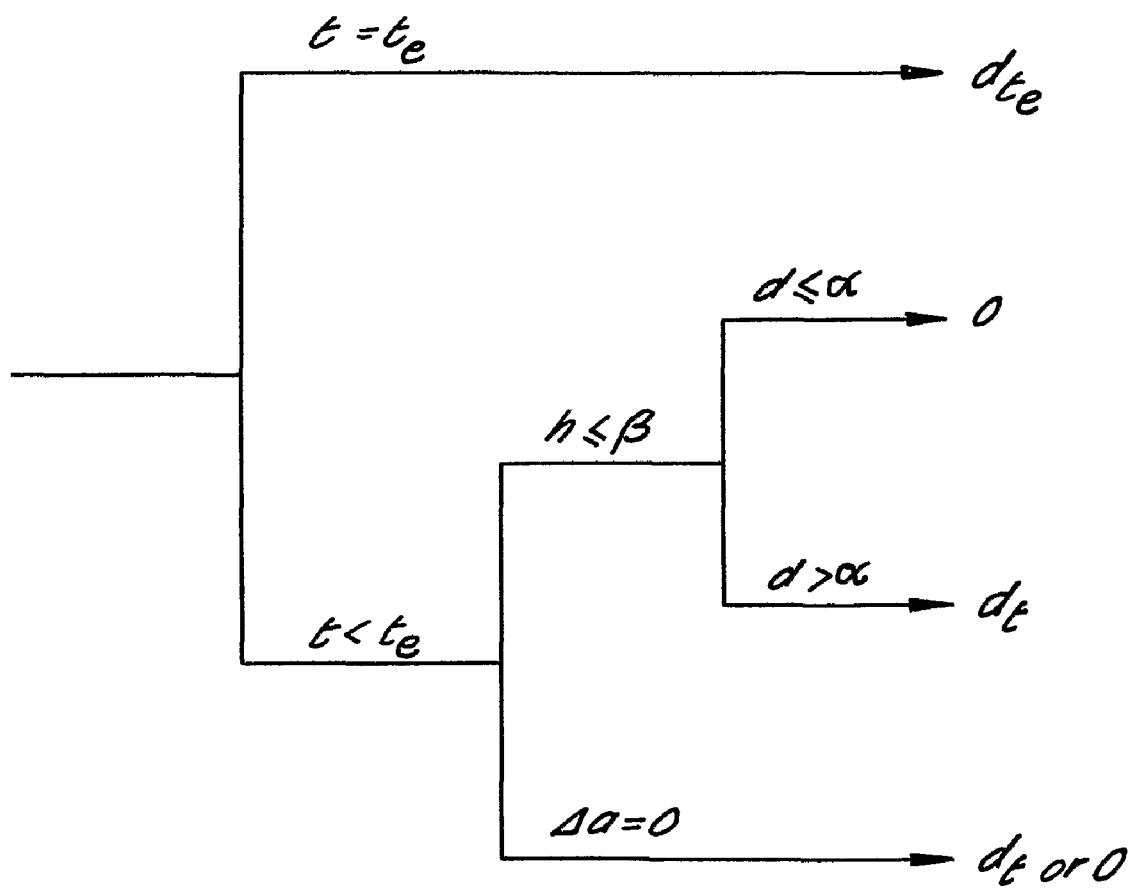
FIG. 5 shows a decision tree for evolving the parameters of the neural network of FIG. 4, for example.

The individuals are selected on the basis of a fitness function which is depicted graphically in FIG. 5. The overall fitness criterion selected is the distance, d, of the hindmost foot 60 of the simulated biped 10 from an origin at which locomotion commences. The hindmost foot is chosen as a reference point so as to penalise individuals that take only one large stride.

The fitness function decision tree of FIG. 5 serves several functions. Importantly, it enforces the early abortion of unpromising runs ($t < t_e$), in order to speed up evolution. A run is aborted if the position of the centre of mass (CoM) falls below a predetermined height, $, i.e. h<$. This criterion penalises falling down, as well as grotesque movements. Individuals that fall over without previously moving (d<", where " is a distance threshold) are assigned a fitness of 0. If a point attractor ( )a=0) is reached, and the biped's movement forward stops, then the result may be discarded (i.e. fitness set to zero) or may be used as part of the next population ($d_t$), at the user's discretion. In FIG. 5, t is time, $t_e$ is maximum time, h is the CoM height, $ is the CoM height threshold, " is a distance threshold,) a is a measure of the change in activation in the neural network of FIG. 4, and d is the distance from the hindmost foot 60 of the biped 10 to an origin.

It has been found that a weak assisting controller is preferable to permit rapid evolution of stable locomotion control of the biped 10. This assisting controller is applied only at the beginning of an evolutionary run, in order to support the trunk 20 both laterally and sagittally. The controller takes the form of an un-damped orientation spring between the trunk 20 and a reference "frame" for the biped 10. The spring has no displacement parameters, that is, the torque exerted on the trunk 20 is dependent only on its orientation, not its position.

The ancillary controller serves initially to guide evolution towards the production of rhythmic step cycles during early mutations. When the genetic algorithm has found a solution with suitably high fitness using the torso stabiliser, its strength (that is, the spring stiffness) is reduced and the search restarted, seeded with the population from the previous optimization procedure. The stiffness of the spring is iteratively reduced until the stabiliser is weak enough to be discarded or at least not to visibly impair biped simulation. The advantage of this procedure will be further understood with reference to FIGS. 7a, 7b and 8 described below.

Figure 6A:
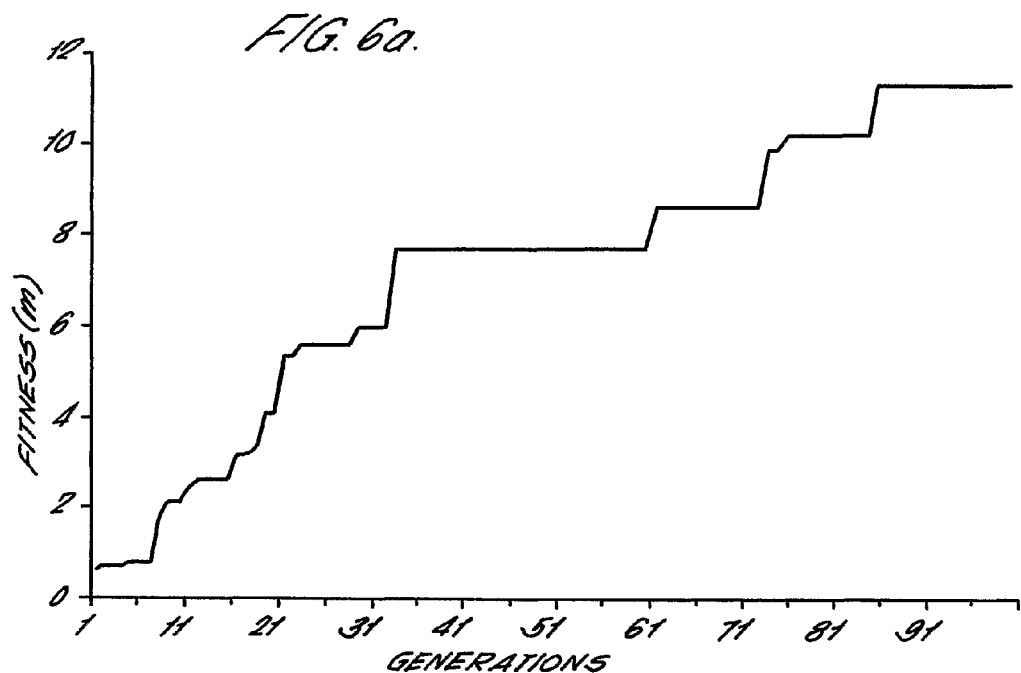
FIGS. 6a and 6b show two exemplary graphs of fitness, defined as distance travelled by the rear foot of the biped of FIGS. 1 and 2, as a function of the number of generations of evolution of the neural network parameters, when evolved using the decision tree of FIG. 5 and when applied to the neural network of FIG. 4.
Figure 6B:
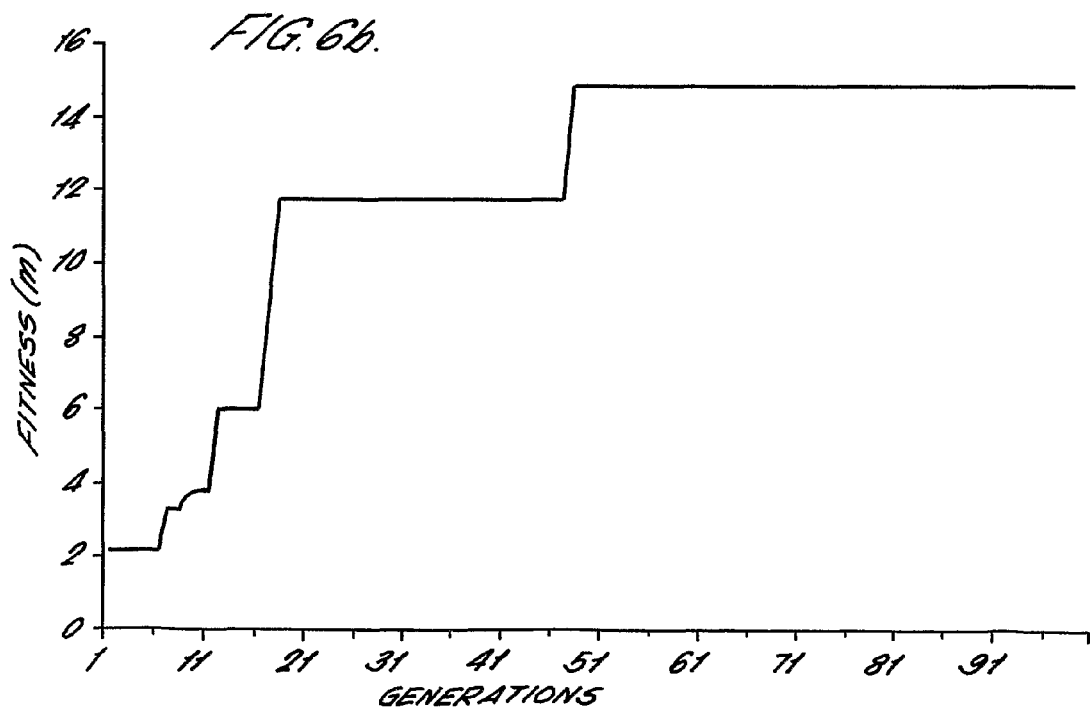

Referring now to FIGS. 6a and 6b, two representative plots of fitness, in metres, as a function of number of generations of evolution are shown. It is noted that each of these representative plots indicates that successful straight line walking has been achieved. In each case, the ancillary controller described in connection with FIG. 5 was activated. It will in particular be noticed that realistic straight line walking occurs within a relatively small number of generations. The average walking speed of walkers was 0.8 m/s with maximum speeds of about 1.2 m/s reached by some individuals.

Figure 7A:
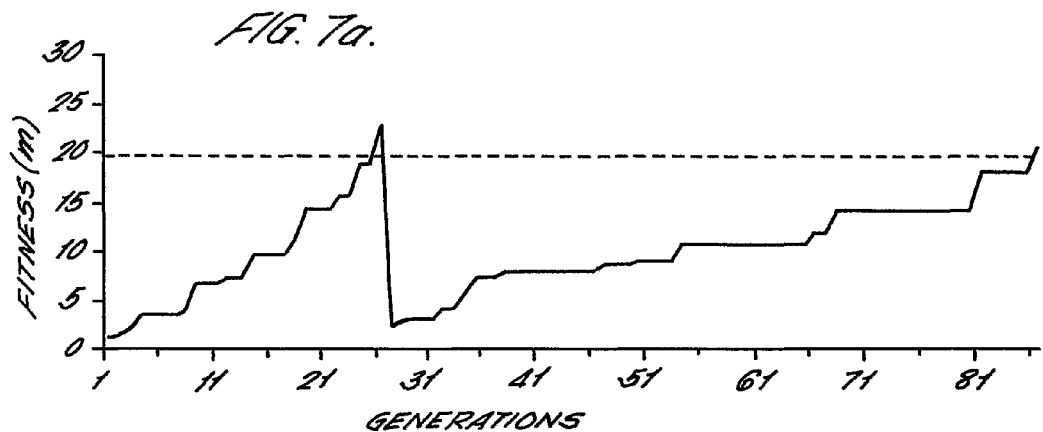
FIGS. 7a and 7b show two further exemplary graphs of fitness versus number of evolutionary generations, with an ancillary stabilisation controller employed that is deactivated after the fitness reaches a predetermined distance.
Figure 7B:
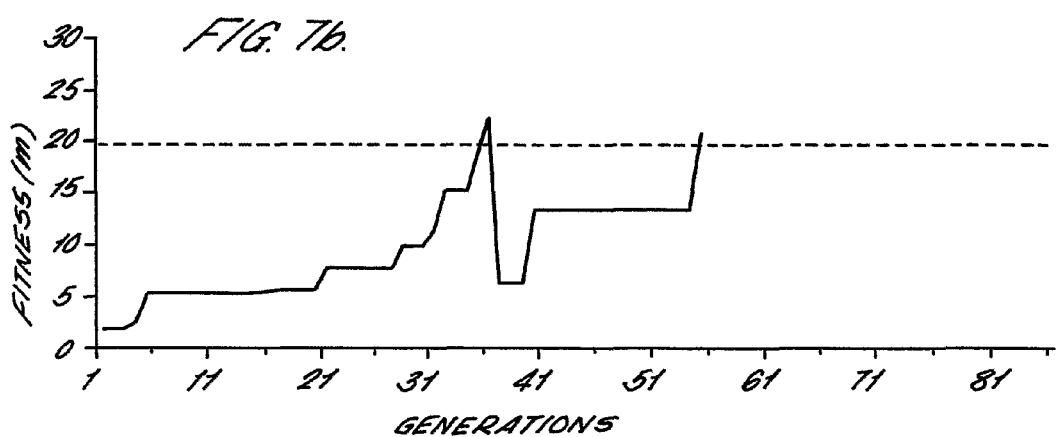
Figure 8:
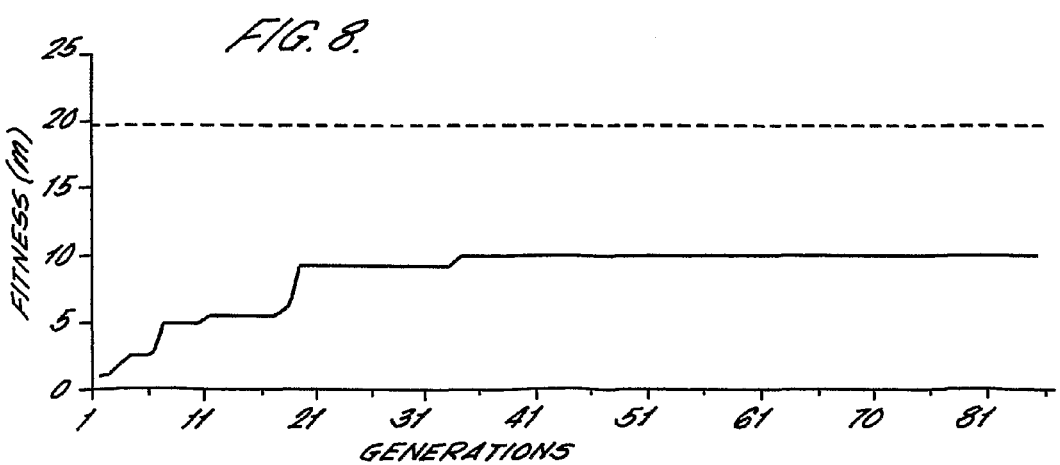
FIG. 8 shows another exemplary graph of fitness versus the number of evolutionary generations, with no ancillary stability controller employed.

Because initial runs were performed with a weak stabilising ancillary controller, populations of controllers that permitted stable walking of the biped 10 were picked at random from a series of evolutionary runs and re-evolved with the effect of the ancillary controller substantially reduced. It was found that these individuals reliably evolved to attain the previously achieved fitness. This is shown in FIGS. 7a and 7b. Here, runs were evolved with ancillary controllers until the biped reached a distance of 20 metres from the origin. The ancillary controller was then switched off and the population re-evolved.

By contrast, control experiments with de novo evolution and de-activated or at least substantially reduced ancillary controllers did not result in successful runs, the measure of success being defined in this case as a minimum fitness of 20 metres. This may be seen from FIG. 8.

Figure 9:
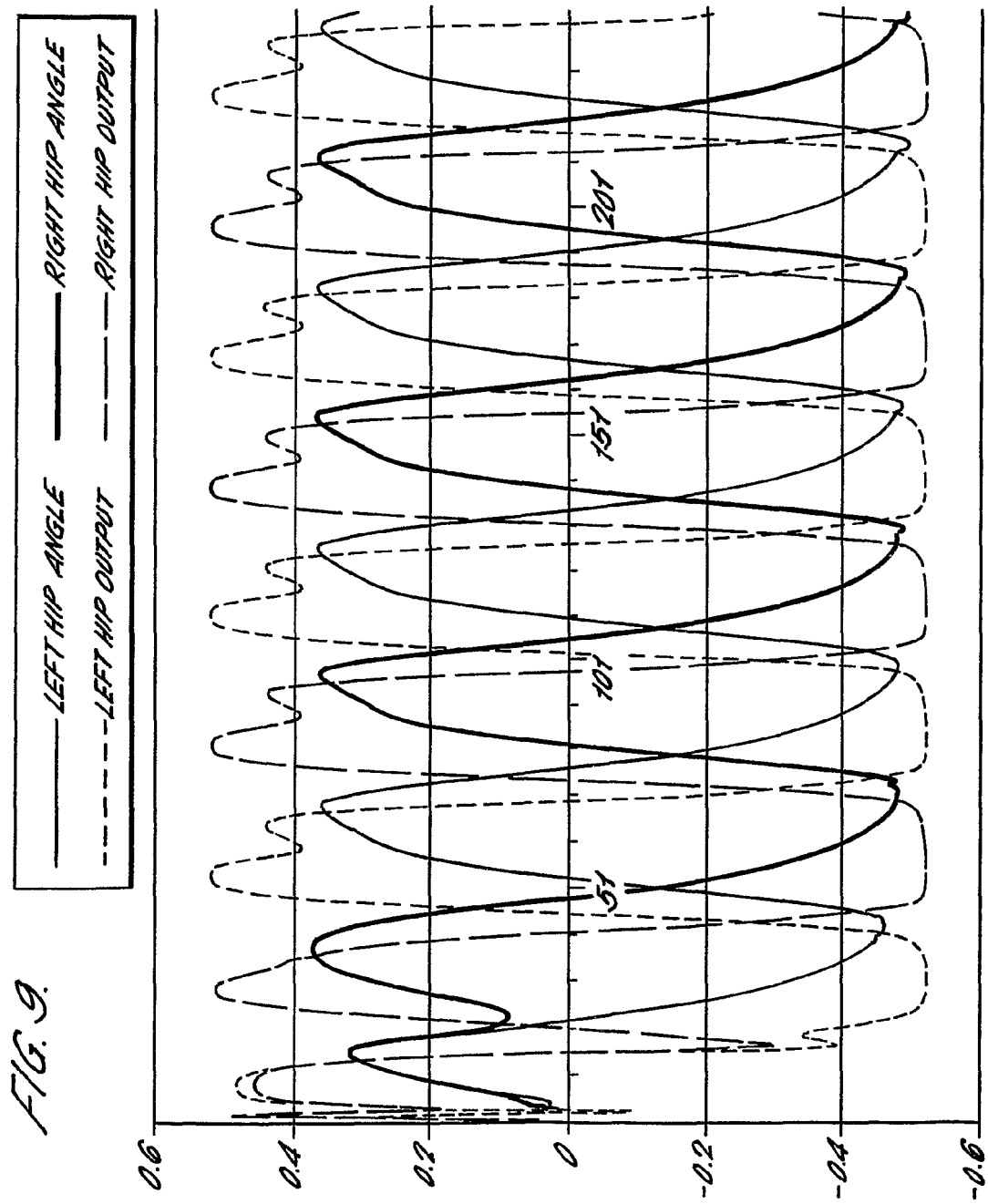
FIG. 9 shows the output, in radians, of the neural network of FIG. 4 with optimised parameters, and the resulting body dynamics of the biped of FIGS. 1 and 2, also in radians, each as a function of time.
Figure 13:
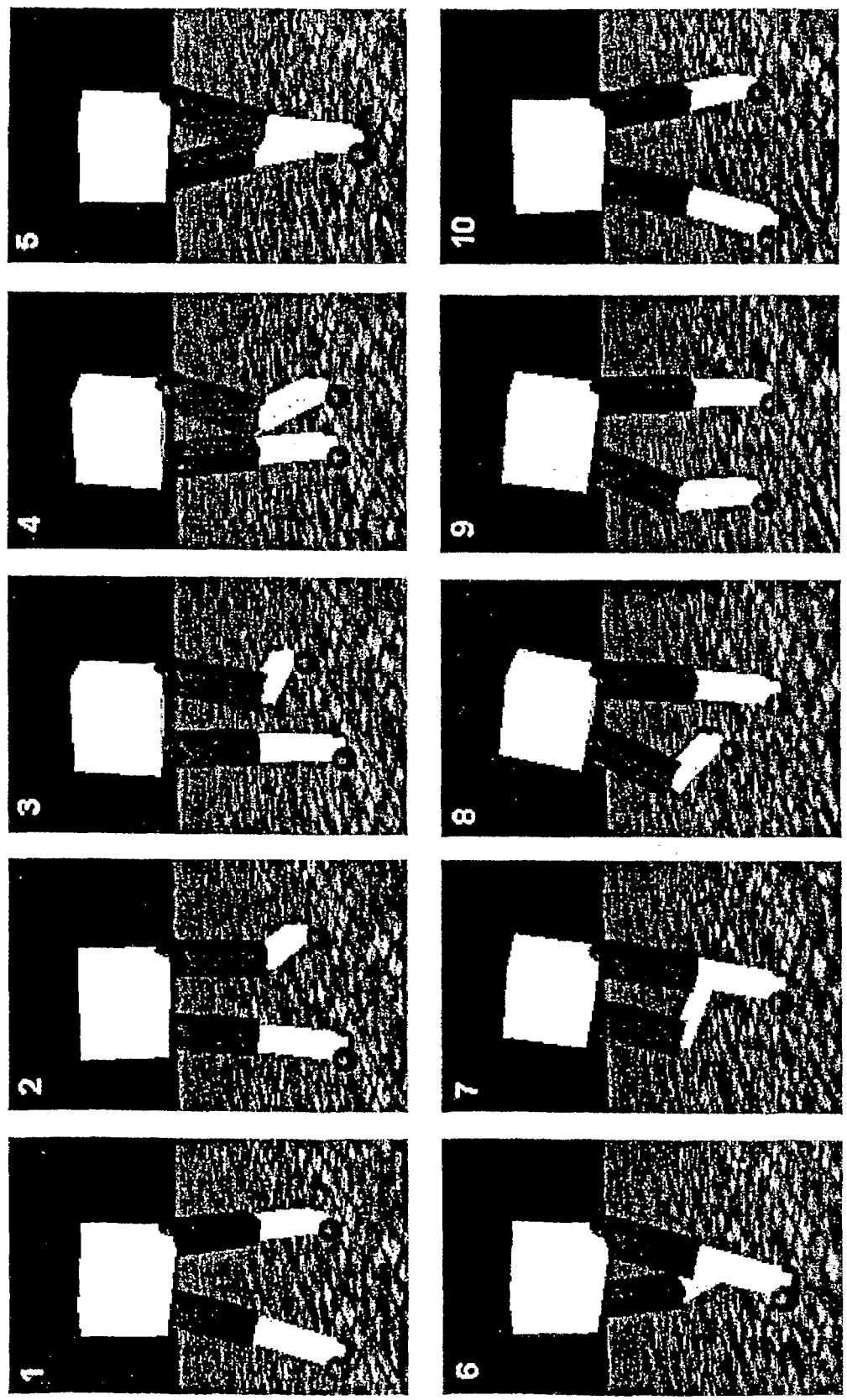
FIG. 13 shows, in perspective, a further sequence of movement of the biped of FIGS. 1 and 2 when actuated in accordance with an aspect of the present invention and controlled in accordance with another aspect of the present invention.

The analysis of the neural activity and the resulting body dynamics show that relatively simple periodic controller outputs sufficed to produce stable walking. This may be seen from FIG. 9, which shows a plot of neural output (desired angles for left and right hips 50, in radians) as a function of time, as well as the resulting body dynamics (the actual angles of the left and right hips 50, again in radians), as a function of time. It will be noted that (a) the periods of the neural output, and the body dynamics (such as the hip angles) were locked, and (b) there is a small sub-oscillation in the neural output. This sub-oscillation is, however, not reflected in the body dynamics, which are shown in FIG. 13 (from which the data of FIG. 9 were obtained). This is because the lag between actual and desired angles acts as a low pass filter, smoothing out small oscillations in the desired angle trace.

Figure 10:
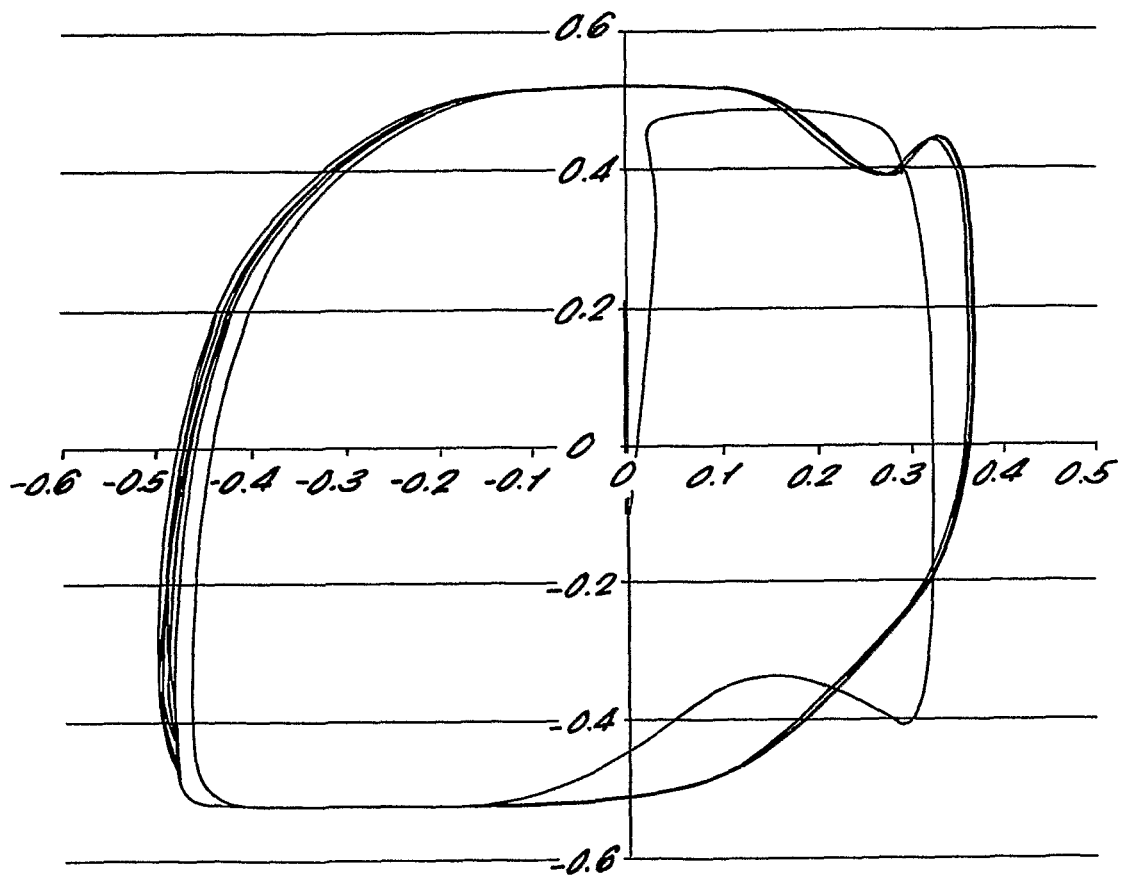
FIG. 10 shows a plot of the left hip angle of the biped of FIG. 1 as a function of the left hip motor neurone output in the neural network of FIG. 4.

FIG. 10 shows a plot of the angle of the left hip 50 of the biped 10 as a function of the output of the motor neurone 101 (FIG. 4) which controls left hip actuation. It will likewise be seen from this Figure that, after an initial settling phase, both periods become locked to one another.

Figure 11A:
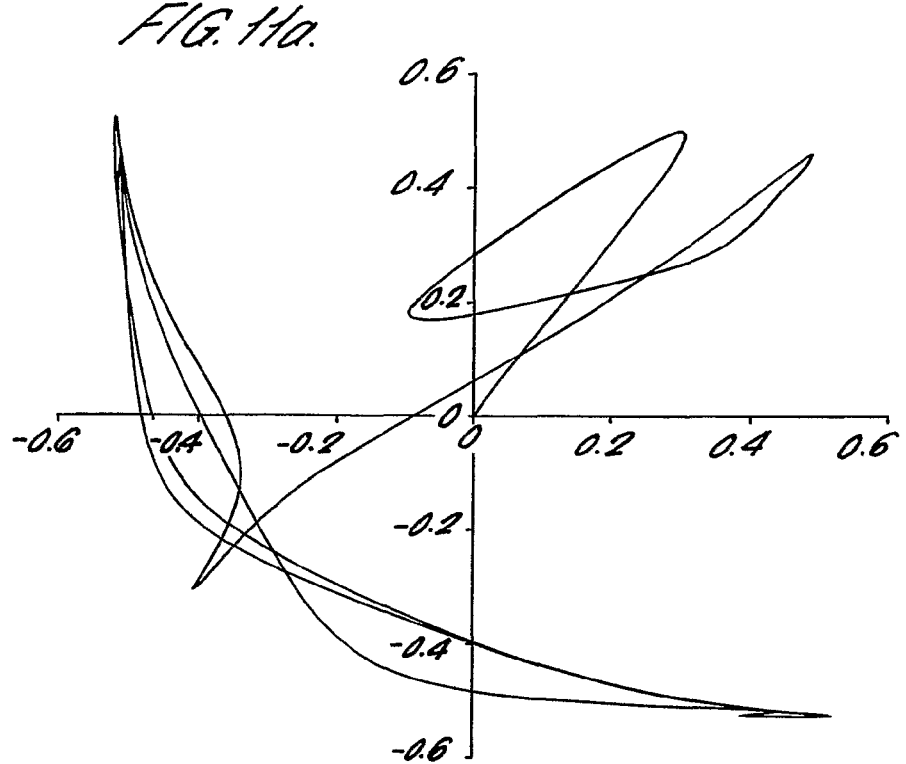
FIGS. 11a and 11b show attractor plots of left and right hip neurone outputs, and left and right actual angles, respectively, for the biped of FIGS. 1 and 2.
Figure 11B:
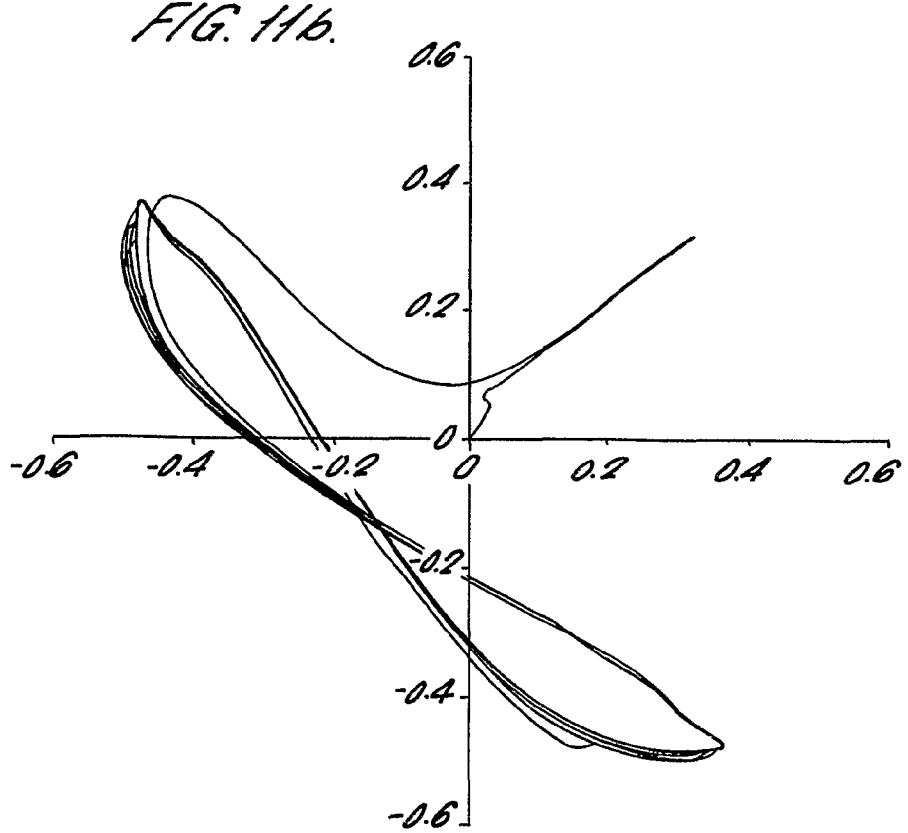
Figure 12:
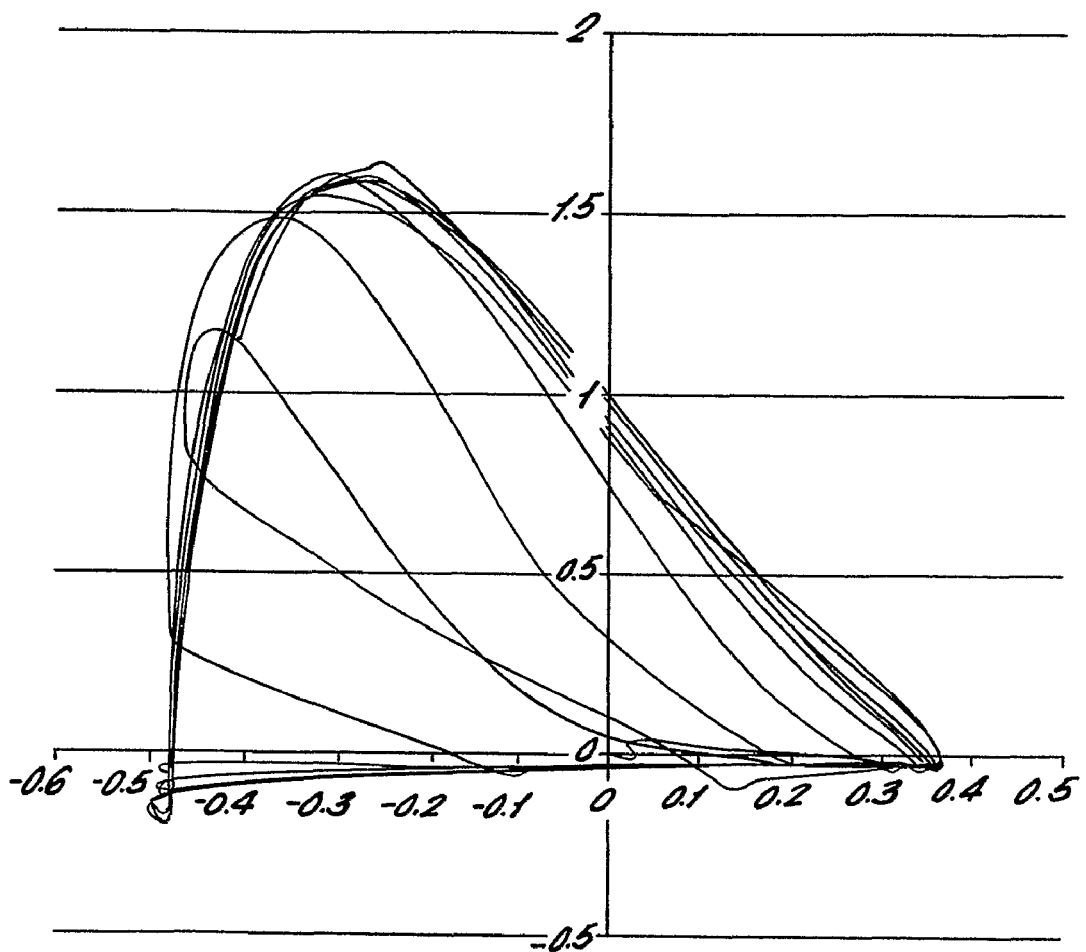
FIG. 12 shows a plot of the left hip angle of the biped of FIGS. 1 and 2, when actuated in accordance with one aspect of the present invention, as a function of the left knee angle of the biped of FIGS. 1 and 2.

FIG. 11a shows an attractor plot of the desired angles of the left and right hip joints 50. FIG. 11b shows an attractor plot of the actual angle of the left and right hip joints 50. Periodic gaits tend to be preceded by a short settling phase, in which the neural outputs and the body dynamics differ from the subsequently established pattern. By visual analysis, it would appear that this initial settling phase is used to initialise the body position for the walking gait. The initial settling phase is more prominent where passive body dynamics are employed (as described in connection with FIG. 2 in particular), rather than a fully actuated leg. This is best understood from FIG. 12, which shows the angle of the left upper leg part 35 of the biped 10, relative to the body trunk 20, as actuated by the hip joint 30, as a function of the angle of the lower leg part 45 relative to the upper leg part 35, which lower leg part is not actuated. It will be noted that it takes several steps until the knee joint 40 reaches its final full swing cycle.

FIG. 13 shows screen shots of the biped 10 of FIGS. 1 and 2, in perspective view, over one gait cycle. It will be seen even from the ten frames illustrated that the gait is highly anthropomorphic i.e. realistic, making full use of the passive dynamics of the body such as the free-swinging lower legs.

Although one specific embodiment has been described, the skilled person will readily understand that various modifications or improvements may be made without departing from the scope of the invention as defined by the accompanying claims. For example, although the foregoing description and drawings refer to a specific rigid body dynamic simulator, it will be understood that the specific implementation is not crucial to an understanding of the invention. For example, other simulation tools, such as FastDynamics Version 1.005, or the more recent "Dynamics Toolkit", both by MathEngine plc could equally be used. Havok Hardcore™, by Havok and VorteX™, by Critical Mass Labs, are likewise suitable physics engines. Furthermore, because of the increased flexibility afforded by the neuro-evolutionary approach outlined above, in particular with respect to body implementation, it is relatively straightforward (and quick, on a modern p.c.) to test different mass distributions, body dimensions, and actuator or joint types simply by evolving suitable controllers.

What is claimed is:

1. A method of displaying locomotion of a computer-generated multiped, the method comprising:
    generating an image, on a visual display unit, of a multiped having a trunk and a plurality of legs depending therefrom, each leg comprising a first, upper part and a second, relatively lower part;
    using a neural controller to generate a control signal, the neural controller comprising two bi-directionally coupled chains of oscillators, each chain having a number of oscillators corresponding to the number of legs in the plurality, each oscillator being represented by a neural network;
    calculating a torque to apply to the upper parts of two respective legs, the torque being a function, at least in part, of the control signal and one or more user-specified constraints;
    simulating actuation of the upper parts of the two respective legs in accordance with the calculated torque;
    simulating swinging of the lower parts of the two respective legs in response to the simulated actuation of the upper parts of the legs; and
    simultaneously displaying the simulated actuation of the upper parts of the two respective legs and the simulated swinging of the lower parts of the two respective legs, to animate locomotion of the image of the multiped.

2. The method of claim 1, wherein the oscillators in the two bi-directionally coupled chains of oscillators are identical.

3. The method of claim 1, wherein each oscillator is represented by a fully connected recurrent neural network (RNN).

4. The method of claim 3, wherein each RNN includes six neurones.

5. The method of claim 3, wherein the control signal comprises the output of a motor neurone in each chain.

6. The method of claim 3, wherein each RNN in one of the chains is connected to a laterally adjacent RNN in another of the chains via symmetrical weights to provide bi-directional coupling therebetween, and in which each neurone in each RNN is arranged to synapse with an equivalent neurone in said laterally adjacent RNN.

7. The method of claim 6, wherein neurones within each RNN in one of the chains are unidirectionally connected to corresponding neurones within a next RNN in the same chain.

8. The method of claim 3, further comprising determining properties of neurones and their connections within the RNNs on the basis of a genetic algorithm.

9. The method of claim 8, wherein the genetic algorithm performs rank-based selection with respect to a fitness criterion.

10. The method of claim 1, wherein the multiped is a biped having two legs, and wherein the number of oscillators in each chain is two.

11. The method of claim 1, wherein the number of oscillators in each chain equals the number of legs in the plurality.

12. The method of claim 1, wherein the control signal specifies a desired relative angle between the upper parts of the two respective legs.

13. The method of claim 12, the torque further being a function of an actual relative angle between the two respective legs and a relative angular velocity of the two respective legs.

14. The method of claim 1, wherein the one or more user-specified constraints comprise a maximum torque.

15. The method of claim 1, wherein the torque is calculated by a proportional integral derivative (PID) controller or a proportional derivative (PD) controller.

16. The method of claim 15, wherein the one or more user-specified constraints comprise proportional, integral, and derivative coefficients.

17. The method of claim 1, wherein the torque is calculated by a force limited velocity constraint actuator in accordance with a user-specified desired relative velocity between the two respective legs.

18. The method of claim 1, wherein simulating actuation of the upper parts of the two respective legs includes simulating application of the calculated torque equally and oppositely to the upper parts of the two respective legs.

19. The method of claim 1, wherein the simulated swinging of the lower parts of the two respective legs comprises passive swinging.

20. The method of claim 1, wherein simulating the swinging of the lower parts of the two respective legs comprises simulating kneecaps to stop the swinging.

21. The method of claim 1, wherein simulating the swinging of the lower parts of the two respective legs comprises simulating application of a substantially constant torque between upper and lower leg parts that tends to straighten the correspond leg.

* * * * *